United States Patent [19]

Goldman

[11] Patent Number: 4,955,003
[45] Date of Patent: Sep. 4, 1990

[54] PHASE ACCUMULATOR-BEARING TRACKER

[75] Inventor: Warren A. Goldman, Fitchville, Conn.

[73] Assignee: The United States of America as represented by the Secretary of the Navy, Washington, D.C.

[21] Appl. No.: 617,282

[22] Filed: Jun. 4, 1984

[51] Int. Cl.$^5$ .............................................. G01S 3/80
[52] U.S. Cl. .................................................... 367/125
[58] Field of Search ......................................... 367/125

[56] References Cited

U.S. PATENT DOCUMENTS 4,333,170  6/1982  Mathews et al. .................... 367/125

Primary Examiner—Thomas H. Tarcza
Assistant Examiner—Daniel T. Pihulic
Attorney, Agent, or Firm—Michael J. McGowan; Prithvi C. Lall

[57] ABSTRACT

A passive sonar bearing tracker having spaced arrays wherein the target bearing is a function of the electrical phase angle of the signal between the arrays. Confidence in the bearing estimate is increased in spite of the relatively narrow bandwidth of the signal and a low signal-to-noise ratio by sequentially bandpass frequency filtering each very narrow component of the narrow-band signal, computing the phase difference between respective filter pairs, accumulating the phase differences over a selected time period and displaying the phase difference calibrated as a bearing. In a second embodiment the individual differences are weighed according to the magnitude of the frequency signal at the associated very narrow band.

4 Claims, 1 Drawing Sheet

PHASE ACCUMULATOR-BEARING TRACKER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to an electronic tracking system and more particularly to a system for tracking frequency and phase angle of time varying signals when used in conjunction with one or more spatial arrays.

(2) Description of the Prior Art

A wide variety of bearing and other angular tracking techniques and algorithms exist for use in passive sonar detection and bearing estimation. These methods have limited capability to obtain fine bearing estimates at low signal-to-noise ratios due to long integration times required when utilizing narrow bandwidths. Present methods also require elaborate frequency tracker algorithms to track frequency dynamics if narrow bandwidths are utilized. In addition, the prior art performs bandpass filtering for. only the filter or bin at the frequency of interest.

SUMMARY OF THE INVENTION

Accordingly, it is a general purpose and object of the present invention to improve the performance of electronic signal processing systems to track the frequency and phase angle of time varying signals and therefore to more accurately determine the arrival angle of signals with respect to a receiving array. It is a further object that when applied to signals derived from one or more arrays distributed spatially with respect to each other this invention is characterized as a bearing tracker. Another object is that the bearing tracker described herein offers implementation simplicity, improved accuracy under low signal-to-noise conditions, and produces output signals suitable for display such that improved operator recognition differential and smoothing of bearing estimates is achieved.

These objects are accomplished with the present invention by providing a signal processing technique where sensor data from an array segmented into two or more spatially distinct subarrays is used to compute a plurality of phase differences covering a selected frequency band. Signals from each subarray are passed through sequential bandpass frequency filters or FFT's to produce the in-phase and quadrature components for each filter or bin around the frequency of interest. These components are then used to compute the electrical phase differences due to the difference in time arrivals of the signal between subarrays The phase differences of a number of frequency filters around the frequency of interest are then deposited and accumulated over a specified time period into phase cells distributed between $-180°$ and $+180°$ of electrical phase for display. Since phase difference between the subarrays is random when noise predominates, frequency filters in which signal predominates produce a more consistent depositing into specific phase cells. This bearing tracker technique allows the use of narrow bandwidths in conjunction with sequential bandpass fi a bearing time history display which improves recognition differential and allows electronic time to be reduced, therefore increasing the detection of fine bearing estimates at low signal-to-noise ratios.

A more complete understanding of invention and many of the attendant advantages thereto be readily appreciated as the same becomes better understood by reference to the following detailed description when considered in conjunction with the accompanying draw wherein:

DESCRIPTION OF THE PREFERRED EMBODIMENT

Figure 1:
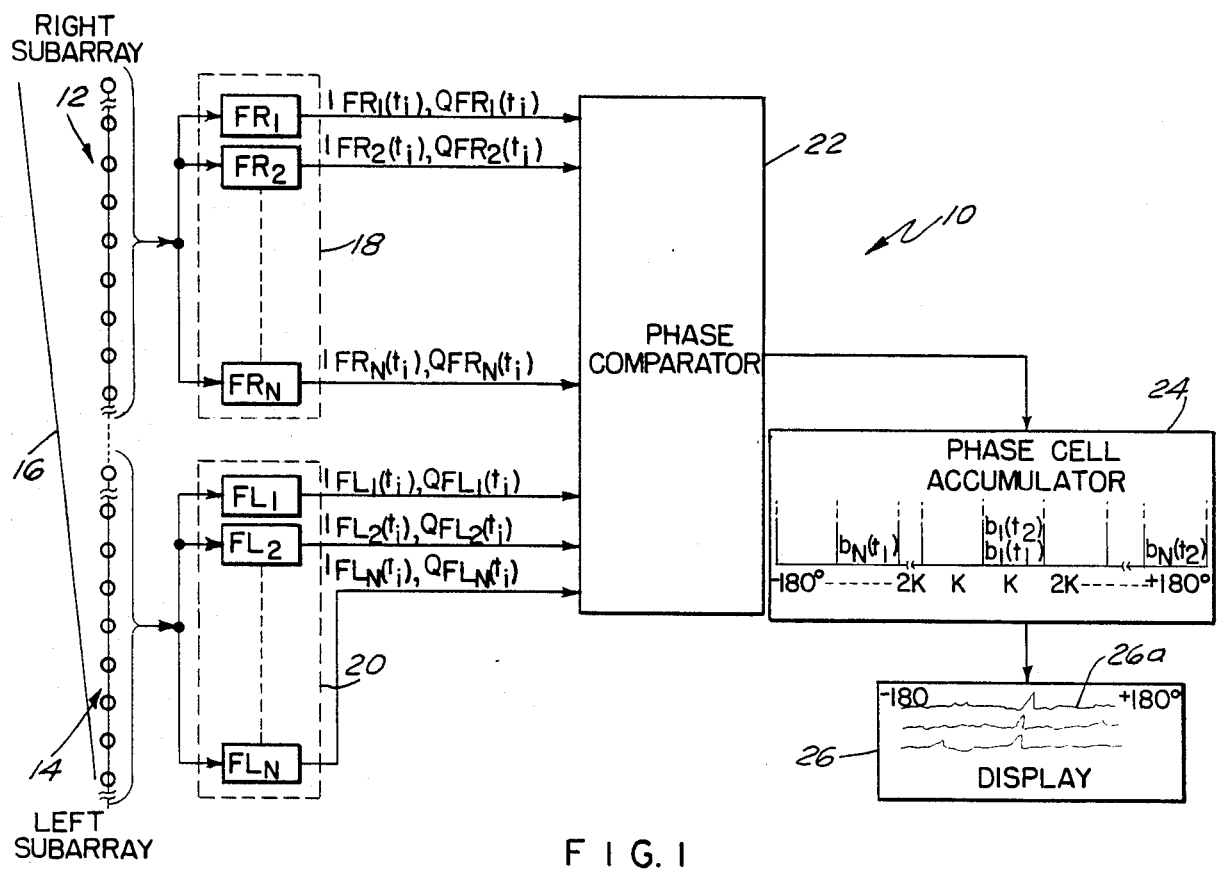
FIG. 1 shows a block diagram of an embodiment of the present invention.

Referring now to FIG. 1 there is shown a tracking system 10 built according to the teachings of the present invention. The bearing tracker technique applies to the situation where an array can be segmented into two or more spatially distinct subarrays, 12 and 14, where the incoming signal can be characterized as containing phase information which can be related to the arrival angle which the incoming signal 16 makes to the spatial surface on which the subarrays lie. Beamforming is used for each subarray to produce an output which is additive and directional. Right subarray 12 may be the forward or aft half of a single line array or may be a separate line array. Left subarray 14 then represents the corresponding half array or a second spatially distinct line array. Subarrays can also be formed from conformal arrays although line arrays are preferred. As shown in FIG. 1, the signals from subarray 12 are passed through a preselected number N of sequential bandpass frequency filters or FAST FOURIER TRANSFORM (FFT) bins 18 which produce the real, in-phase (I) and imaginary, quadrature (Q) components for each frequency filter or FFT bin ($FR_N$) for subarray 2. The signals from subarray 14 are passed through a corresponding N sequential bandpass filters or FFT bins 20 ($FL_N$) producing the corresponding I and Q components for subarray 14. These components are then used by phase comparator 22 to compute N electrical phase differences $b_1$ through $b_N$, one for each right-left pair of filters, due to the difference in the time of arrival of signal 16 between the subarrays using the relationship:

$$b_N(t_i) = \Delta\phi RL_N(t_i) = \tan^{-1}\left( \frac{I_{FR_N(t_i)}Q_{FL_N(t_i)} - Q_{FR_N(t_i)}I_{FL_N(t_i)}}{I_{FR_N(t_i)}I_{FL_N(t_i)} + Q_{FR_N(t_i)}Q_{FL_N(t_i)}} \right)$$

The phase difference output from the N frequency filter pairs around the frequency of interest are then fed to phase cell accumulator 24 and deposited into a preselected number (K) of phase cells distributed between $-180°$ and $+180°$ of electrical phase. Phase cells may be digital counters or the like. Phase difference data is sampled and accumulated into the phase cell accumulator over a selected period of time ($t_i: i=1...n$). Since phase difference between the subarrays is random when noise predominates, frequency filters or bins in which signal predominates produce a more consistent depositing into specific phase cells. For example, if $FR_1$ and FL₁ contain signal, then $b_i(t_i)$ will deposit more consistently into a specific phase cell, while the phase differences $b_2(t_i)$ to $b_N(t_i)$ will deposit randomly into the phase cell accumulator. For this embodiment, i must be $\geq 2$ in order to produce a sufficient buildup in one or more close set cells to produce a 26a trace. After reaching the preset i the system is reset to produce the next 26a line. The time accumulated phase cell data is then transmitted to display 26 for visual integration by depiction as trace 26a using either intensity modulation or y deflection techniques. The sequence is repeated so as to produce a waterfall display of bearing vs. time traces 26a.

Figure 2:
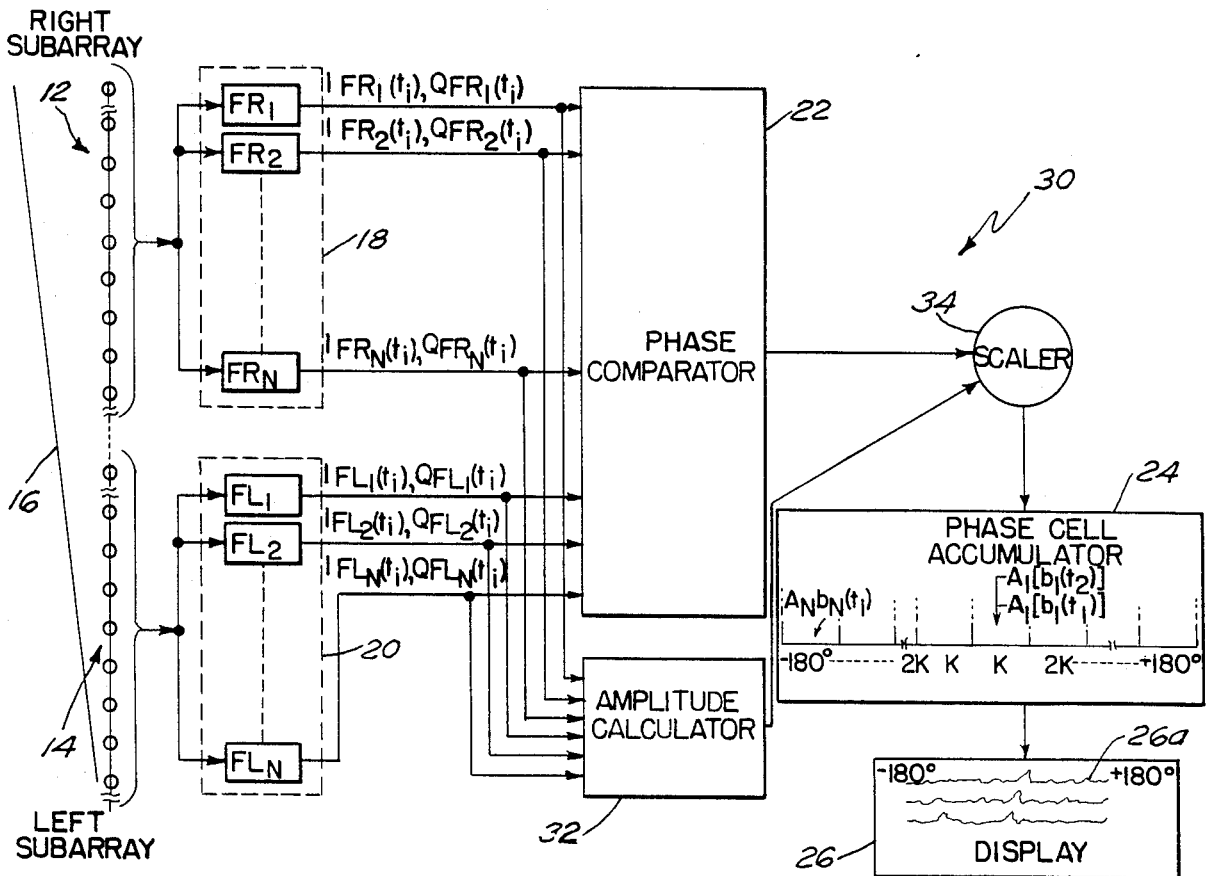
FIG. 2 shows a block diagram of an alternative approach to the configuration of FIG. 1.

An alternate system 30 is shown in FIG. 2, wherein normalized amplitude information i utilized to weigh the phase difference data from respective frequency filters or bins. In this embodiment, the phase difference data is weighed with the corresponding amplitude using amplitude calculator 32 and scaler 34 for each frequency filter or bin. Amplitudes ($A_N$) are determined from the relationship:

$$A_N = (I_{FRn}(t_i) + I_{FLn}(t_i))^2 (Q_{FRN}(t_i) + Q_{FLN}(t_i))^2$$

Those filters or bins with larger amplitudes weigh the corresponding phase difference data with more emphasis than those with smaller amplitudes. Therefore the filters that contain signal would not only deposit the phase difference into a specific phase cell, but would accumulate at a higher value then those filters with a smaller amplitude and random depositing. This enhances tracker performance and allows a larger frequency window to be utilized. Because the signal data is amplitude weighed, a $t_1$ only may suffice for each trace 26a on display 26; however, additional $t_i$ may improve performance.

Since the relationship between electrical phase and bearing depends on signal frequency, target azimuth and array geometry, the angular increment of the phase cell accumulator is selected dependent upon these parameters. For example, for a selected line array having a specific acoustic aperture and hydrophone spacing, five degrees of electrical phase equals approximately one degree of bearing for a chosen frequency and azimuth. Therefore, it is not necessary to have phase cells from −180 degrees to +180 degrees in 1° increments A phase cell accumulator of only 72 cells from 180° to −180° in 5° increments for this particular array is sufficient, each phase cell being equal to one degree of bearing. As the frequency and azimuth varies the bearing degrees per phase increment also varies. An operator observing a bearing time history display such as 26 would use a cursor to center on any bright strips if intensity is used to normalize the phase cell accumulator that appear o the display to obtain his bearing estimate.

An advantage of the present invention over the prior art trackers is that this bearing tracker allows the use of narrow bandwidths, utilizes sequential bandpass filters in conjunction with a bearing time history display which improves operator recognition differential and allows electronic integration time to be reduced therefore increasing the detection of fine bearing estimates at low signal-to-noise ratios. The prior art does not perform sequential bandpass filtering around the target of interest to determine target bearing; rather only the filter or bin at the frequency of interest is bandpass filtered. This bearing technique also allows fine bearing estimates utilizing narrow bandwidths, without concern for doppler shifts or signal energy spread in more than one sequential filter or bin, if enough frequency filters are utilized to obtain a large enough bandwidth to cover frequency dynamics.

What has thus been described is a signal processing technique using sensor data from an array segmented into two or more spatially distinct subarrays to compute a plurality of phase differences over a selected frequency band. Signals from each subarray are passed through sequential bandpass frequency filters or FFT's to produce the in-phase and quadrature components for each frequency of interest. These components are used to compute the electrical differences due to the difference in time arrivals of the signal between subarrays. The phase differences of N frequency filters around the frequency of interest are then deposited and accumulated over a preselected time period into integral phase cells distributed between −180° and +180° of electrical phase for display. This bearing tracker technique allows the use of narrow bandwidths in conjunction with sequential filtering and a bearing time history display which improves operator recognition differential and allows electronic integration time to be!reduced, thereby increasing the detection of fine bearing estimates at low signal-to-noise ratios.

Obviously many modifications and variations of the present invention may become apparent in light of the above teachings. For example: the main concept of this invention is use of a phase cell accumulator in conjunction with sequential bandpass filtering. This filtering can be accomplished using any method from a Fast Fourier Transform to utilizing bandpass filtering. Variations in displays can also be utilized from a Bearing Time History type display to a single line type display. The number of phase bins can also be modified depending upon the type of sonar used and bearing resolution that is desired.

In light of the above, it is therefore understood that within the scope of the appended claims, the invention may be practiced otherwise than as specifically described.

What is claimed is:
1. A tracking apparatus for passively determining the bearing of a remote source, comprising:
   a first transducer means, for receiving an impinging acoustic signal from said remote source and converting said acoustic signal into a first proportional electrical signal;
   a second transducer means, spatially displaced from said first transducer means, for receiving said impinging acoustic signal from said remote source and converting said acoustic signal into a second proportional electrical signal;
   a first plurality of sequential bandpass filter means, attached to said first transducer means, for receiving said first electrical signal and producing a corresponding first plurality of in-phase and quadrature components for each said first plurality of filter means therefrom, each said first filter means being selected to cover a contiguous portion of the frequency band of interest such that collectively said first plurality of filter means encompass the frequency band of interest;
   a second plurality of sequential bandpass filter means, attached to said second transducer means, for receiving said second electrical signal and producing a corresponding second plurality of in-phase and quadrature components for each said second plu- rality of filter means therefrom, each said second filter means being selected to cover a contiguous portion of the frequency band of interest such that collectively said second plurality of filter means encompass the frequency band of interest;

phase comparator means, connected to said first and said second plurality of bandpass filter means, for receiving said first and said second plurality of in-phase and quadrature components therefrom and determining a corresponding plurality of respective electrical phase differences, $b_1$-$b_N$, one difference for each pair of corresponding first and second filter means covering an identical portion of said frequency band;

accumulator means, attached to said phase comparator means, for receiving said plurality of phase differences, $b_1$-$b_N$, for a present plurality of time intervals $t_i$, said accumulator means further comprising a preselected plurality of phase cells chosen to correspond to degrees of bearing, wherein said plurality of phase differences are selectively distributed;

display means, connected to said accumulator means, for receiving the accumulated phase difference outputs $b_1(ti)$-$(b_n(ti)$ of said phase cells for each $t_i$ and producing a plurality of proportional bearing vs. time traces, one trace for each preselected range, i, of accumulation time $t_i$;

an amplitude calculating means, connected to each of said first and second pluralities of bandpass filter means, for receiving said first and second pluralities of in-phase and quadrature components therefrom and calculating a corresponding plurality of amplitudes, $A_1$-$A_N$, therewith; and scaler means, connected to said phase comparator means, said amplitude calculating means and said accumulator means, for receiving said plurality of electrical phase differences, $b_1$-$b_N$, from said phase comparator means and weighing each said phase difference with the corresponding amplitude, $A_1$-$A_N$, before depositing the resulting plurality of products, $A_1b_1$-$A_nb_N$, into said accumulator means.

2. A tracking apparatus according to claim 1 wherein said first and second transducer means further comprise first and second transducer subarrays respectively, said first and second proportional electrical signal outputs therefrom being selectively beamformed.

3. A tracking apparatus according to claim 2 wherein said first and second plurality of bandpass filter means further comprise FFTs.

4. A tracking apparatus according to claim 3 wherein said time interval range, i is $\geq 1$.

* * * * *